May 9, 1967
M. L. DEARDORFF
3,318,407
TRACK DRIVE CYCLE
Filed Nov. 19, 1964
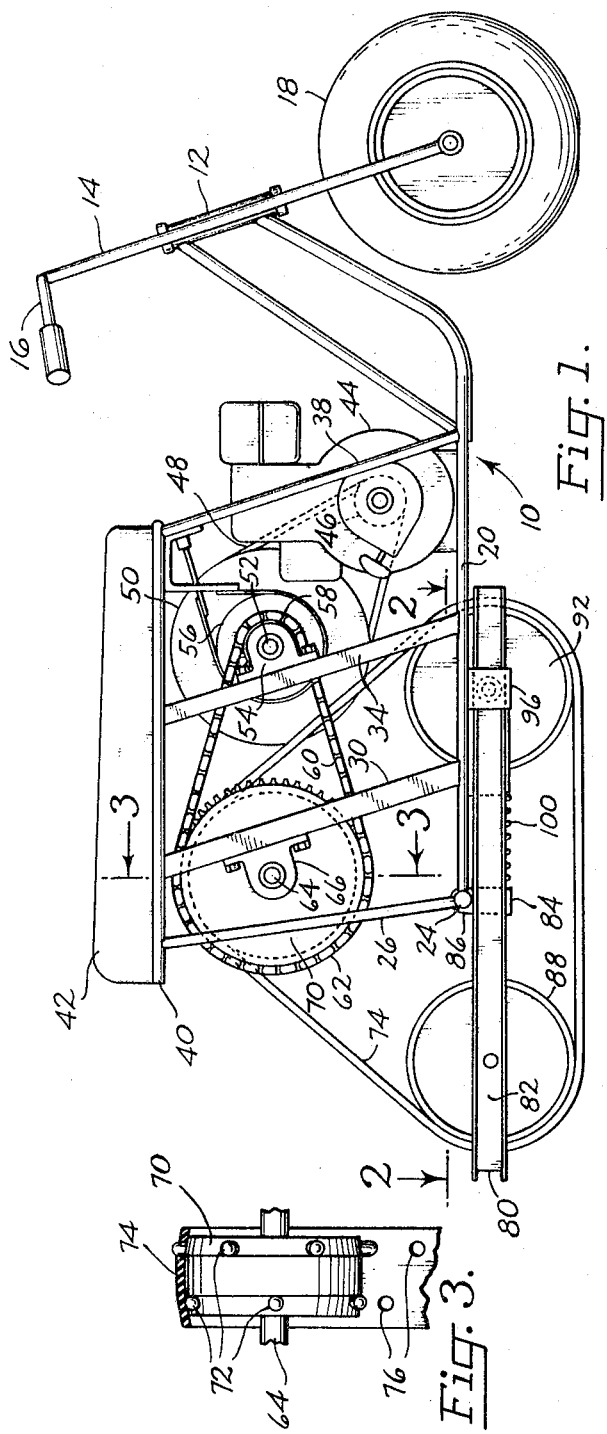
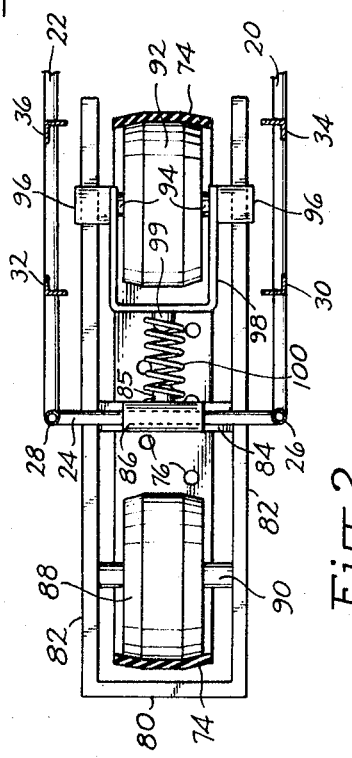
Merle L. Deardorff
INVENTOR.
BY Eugene O. Farley
Atty.

3,318,407
TRACK DRIVE CYCLE
Merle L. Deardorff, Puyallup, Wash., assignor to Willys L. Olander, Tacoma, Wash.
Filed Nov. 19, 1964, Ser. No. 412,498
1 Claim. (Cl. 180—9.24)

This invention relates to vehicles. It pertains particularly to track drive cycles.

It is the general object of the present invention to provide a cycle having a unique track drive which makes use of the tread portion of an ordinary automobile tire, and which pivots to accommodate rough terrain such as is found in woods, rocky hills, and swamps. Accordingly the cycle is suited for use by sportsmen, loggers, campers, firefighters and other classes of individuals who from time to time visit places which are difficult of access.

The foregoing and other objects of my invention are accomplished by providing a track drive cycle which broadly comprises a cycle frame having a forwardly mounted steering wheel assembly and a rearwardly mounted track drive assembly. The track drive assembly includes a pair of traction belt guide wheels used in tandem and in alignment with the steering wheel assembly. It also includes a drive sprocket journaled in the frame above the guide wheels in the same vertical plane.

An endless traction belt is mounted on the guide wheels and sprocket. This belt advantageously may comprise the central tread section of a conventional automobile tire with the sidewalls cut away. The remaining tread portion is punched with holes dimensioned to receive the teeth of the sprocket, thus creating a driving engagement. A gasoline engine or other suitable power source drives the sprocket, and hence the cycle.

Considering the foregoing in greater detail and with particular reference to the drawings wherein:

FIG. 1 is a view in side elevation of the track drive cycle of my invention and

FIGS. 2 and 3 are fragmentary sectional views taken respectively along lines 2—2 and 3—3 of FIG. 1:

As is evident from FIG. 1, the track drive cycle of my invention includes a cycle frame indicated generally at 10. The forward end of the frame mounts a sleeve bearing 12 in which is journaled a forked wheel support 14. The latter mounts handlebars 16 on its upper end and front wheel 18 on its lower end.

The rearward portion of frame 10 includes a pair of parallel, longitudinal, horizontal frame members 20, 22; a transverse horizontal shaft 24, which interconnects the rearward ends of frame members 20, 22; and vertically arranged pairs of framing struts 26 and 28, 30 and 32, 34 and 36, and 38. The lower ends of the strut members are connected to longitudinal frame members 20, 22. Their upper ends are connected to a flat seat plate 40 which mounts seat cushion 42.

Although the cycle may be operated by means of foot pedals, it is preferred to drive it by means of a power drive such as gasoline engine 44 suitably mounted on frame 10 and having a built in clutch. The drive wheel 46 of the engine mounts a V belt 48 which engages a pulley 50 fixed to a shaft 52. Shaft 52 is journaled in bearings one of which is indicated at 54 bolted to strut 34. A brake 56 works on the shaft.

A sprocket also is fixed to one end of shaft 52. It drives a chain 60. The latter chain meshes with a sprocket 62 keyed to one end of a shaft 64, the latter being journaled in bearings 66 which are bolted to struts 30, 32.

Sprocket 62 drives a track drive assembly so designed that it is not only provides a powerful track drive, but also accommodates itself to irregularities of terrain.

Rigid to shaft 64 is a specially designed drive sprocket 70, FIG. 3, having an arcuate peripheral surface provided with two annular rows of staggered, radially-extending, tapered teeth 72. The contour of the peripheral surface of sprocket 70 is such as to engage uniformly the arcuate surface of an endless track belt 74 having transversely punched through it a plurality of openings 76. These are spaced and dimensioned to register with and receive teeth 72 of the sprocket.

Although the construction of track belt 74 may be varied as determined by the materials available and the purpose to which the cycle is to be put, it is a primary feature of the invention that the belt may comprise the central tread section only of a conventional automobile tire, preferably an automobile snow tire having a heavy tread surface. Such a belt may be made easily and inexpensively by cutting the sidewalls from a discarded tire and then punching through the remaining endless tread section the spaced holes which receive the teeth of sprocket 70.

Track belt 74 is supported in part by sprocket 70 and in part by a pivoting support assembly the construction of which is illustrated particularly in FIG. 2.

A U-shaped hanger 80 has side pieces 82 and a central crosspiece 84 the front face of which has a spring-retaining stud 85.

Crosspiece 84 mounts an upwardly extending bearing 86 in which is journaled shaft 24 of frame 10. The hanger thus is mounted pivotally intermediate its ends on the shaft.

A rear traction belt guide wheel 88 is fixed to a shaft 90 which in turn is journaled in side pieces 82 of the hanger.

A forward traction belt guide wheel 92 is mounted on a shaft 94 the ends of which are journaled in bearings 96. These bearings are provided with slides receiving the side pieces 82 of U-hanger 80. The side pieces accordingly act as tracks along which bearings 96 slide freely.

Tensioning means insure that belt 74 is stretched to its working condition at all times.

A U-shaped bracket or support 98 having a centrally located, spring retaining stud 99 is welded to sliding bearings 96. This bracket is aligned with and spaced from intermediate crosspiece 84, with which it cooperates in retaining in partly compressed condition a coil tensioning spring 100. This spring is maintained in position by studs 85, 99. It bears against bracket 98, and continually keeps track belt 74 in taut condition.

Belt 74 may be installed easily and simply by removing shaft 24 and the shafts of one or more of the belt mounting wheels. When the cycle traverses rough ground, the rear track drive assembly pivots about shaft 24 to adjust for ground surface irregularities. Belt 74 is maintained under proper working tension at all times. Since the surface of the belt comprises a rough tire tread and engages a large area, the cycle is propelled vigorously over ground which is impassable to ordinary cycles. Also, when the belt is worn or damaged a replacement may be made easily at little or no cost simply by cutting the sidewalls off a conventional tire and punching appropriately spaced holes through the remaining tread portion.

It is to be understood that the form of my invention herein shown and described is to be taken as a preferred example of the same, and that various changes in the shape, size and arrangement of parts may be resorted to without departing from the spirit of my invention or the scope of the subjoined claim.

Having thus described my invention, I claim:

A track drive cycle comprising
 (a) a cycle frame,
 (b) a steering wheel assembly mounted forwardly on the frame,
 (c) a pair of laterally spaced elongated hanger members,
 (d) pivot means mounting the hanger members intermediate their ends on the frame rearwardly of the steering wheel for pivotal movement on an axis transversely of the frame, the pivot means including a transverse support member between the hanger members joining the latter together, (e) a pair of traction belt guide wheels arranged in tandem between the hanger members, (f) fixed bearing means adjacent one end of the hanger members supporting one of the guide wheels for rotation, (g) movable bearing means mounted for longitudinal sliding movement on the hanger members adjacent the opposite end of the latter and supporting the other guide wheel for rotation, (h) a U-shaped support member secured at its terminal ends to the movable bearing means with its closed end extending toward said transverse support member, (i) a drive sprocket journaled in the frame above the guide wheels and in the same vertical plane, (j) an endless traction belt mounted on the guide wheels and sprocket in driving engagement with the latter, (k) spring means interposed between the closed end of the U-shaped support member and the transverse support member operatively interengaging the hanger members and movable bearing means and urging the latter resiliently away from the fixed bearing means for maintaining the traction belt in tension on the drive sprocket and guide wheels, and (l) drive means mounted on the frame and connected to the sprocket for driving the same.

References Cited by the Examiner

UNITED STATES PATENTS

| | | | |
|---|---|---|---|
| 862,240 | 8/1907 | Diehl | 305—35 X |
| 1,279,619 | 9/1918 | Walker | 180—9.5 |
| 2,467,947 | 4/1949 | Skelton | 305—31 X |
| 2,887,343 | 5/1959 | West | 180—9.22 X |
| 3,077,238 | 2/1963 | Nelson | 180—9.24 X |
| 3,082,044 | 3/1963 | Klemm | 305—25 X |
| 3,101,805 | 8/1963 | Tritle | 180—9.24 |
| 3,120,409 | 2/1964 | Beall | 305—57 X |
| 3,219,133 | 11/1965 | Clowers | 305—35 X |

MILTON BUCHLER, *Primary Examiner.*

BENJAMIN HERSH, *Examiner.*

R. J. JOHNSON, *Assistant Examiner.*